United States Patent
Willim

(10) Patent No.: US 8,757,402 B2
(45) Date of Patent: Jun. 24, 2014

(54) MANIPULATOR FOR THE ASSEMBLY OF ROTOR BLADES OF A WIND POWER INSTALLATION

(75) Inventor: Hans-Dieter Willim, Ulm-Unterweiler (DE)

(73) Assignee: Liebherr-Werk Ehingen GmbH, Ehingen (DE)

( * ) Notice: Subject to any disclaimer, the term of this patent is extended or adjusted under 35 U.S.C. 154(b) by 1217 days.

(21) Appl. No.: 12/633,344

(22) Filed: Dec. 8, 2009

(65) Prior Publication Data

US 2010/0158654 A1 Jun. 24, 2010

(30) Foreign Application Priority Data

Dec. 15, 2008 (DE) .............. 20 2008 016578 U

(51) Int. Cl.
- *B66C 1/42* (2006.01)
- *B66C 23/18* (2006.01)
- *F03D 11/00* (2006.01)
- *F03D 1/00* (2006.01)
- *B66C 1/44* (2006.01)
- *B66C 23/66* (2006.01)
- *B66C 23/04* (2006.01)

(52) U.S. Cl.
CPC .............. *B66C 23/66* (2013.01); *B66C 23/185* (2013.01); *Y02E 10/728* (2013.01); *F05B 2230/61* (2013.01); *F03D 11/00* (2013.01); *F03D 1/001* (2013.01); *B66C 1/44* (2013.01); *B66C 23/04* (2013.01); *Y02E 10/722* (2013.01)
USPC ............ 212/168; 212/243; 212/251; 212/259

(58) Field of Classification Search
USPC .......... 212/168, 306, 242, 243, 251, 258, 259
See application file for complete search history.

(56) References Cited

U.S. PATENT DOCUMENTS

| | | | | |
|---|---|---|---|---|
| 3,286,855 A | * | 11/1966 | Bill | 414/23 |
| 3,426,929 A | * | 2/1969 | Vik | 414/715 |
| 3,989,150 A | * | 11/1976 | Stephenson et al. | 414/740 |
| 4,268,217 A | * | 5/1981 | Perreault et al. | 414/740 |
| 4,280,785 A | * | 7/1981 | Albrecht | 414/735 |
| 4,526,278 A | * | 7/1985 | Hebert | 212/242 |
| 5,219,265 A | * | 6/1993 | Recker | 414/731 |
| 5,286,159 A | * | 2/1994 | Honma | 414/728 |
| 5,795,101 A | * | 8/1998 | Bill | 405/184.5 |
| 5,865,492 A | * | 2/1999 | Horton | 294/86.41 |
| 5,918,923 A | * | 7/1999 | Killion | 294/202 |
| 6,280,119 B1 | * | 8/2001 | Ryan et al. | 405/156 |
| 6,325,749 B1 | | 12/2001 | Inokuchi et al. | |
| 6,564,835 B1 | * | 5/2003 | Chai | 144/34.1 |
| 6,592,316 B2 | * | 7/2003 | Hensler | 414/23 |
| 7,086,435 B1 | * | 8/2006 | Coulbourn, Jr. | 144/338 |
| 7,152,519 B2 | * | 12/2006 | Dubreuil | 92/106 |
| 2002/0119030 A1 | * | 8/2002 | Hensler | 414/23 |
| 2007/0266538 A1 | * | 11/2007 | Bervang | 29/428 |

FOREIGN PATENT DOCUMENTS

| | | |
|---|---|---|
| DE | 202006015189 | 2/2008 |
| WO | 2008/061797 | 5/2008 |

* cited by examiner

*Primary Examiner* — Emmanuel M Marcelo
(74) *Attorney, Agent, or Firm* — Dilworth & Barrese, LLP

(57) ABSTRACT

A manipulator, preferably for the assembly of rotor blades of a wind power installation, has a receiving unit for the receiving of a rotor blade and a connection unit via which the manipulator is connected or connectable to the boom of a crane in a torque-rigid manner so that the position and/or alignment of a rotor blade received in the receiving unit relative to the boom can be fixed by the manipulator.

16 Claims, 9 Drawing Sheets

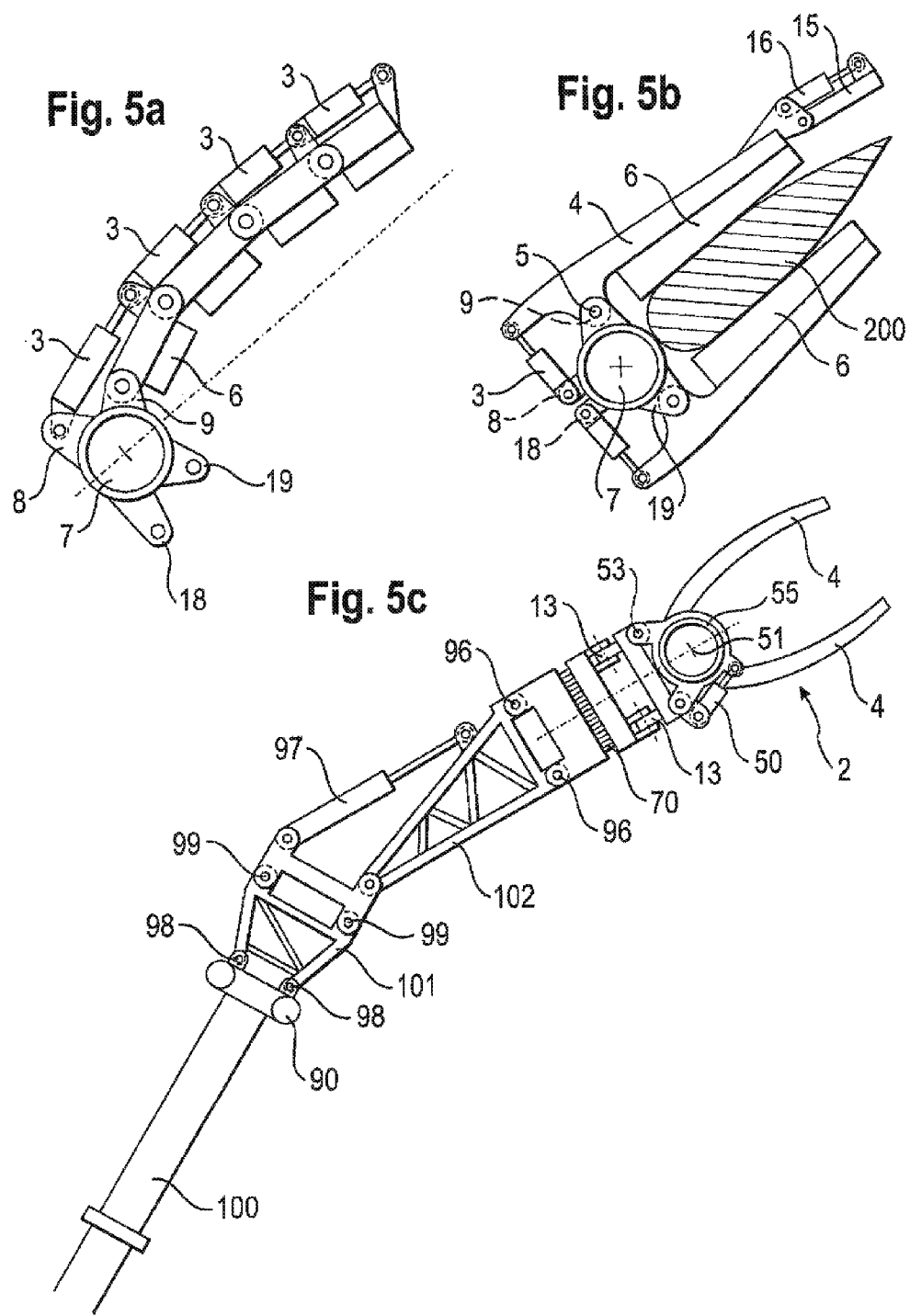

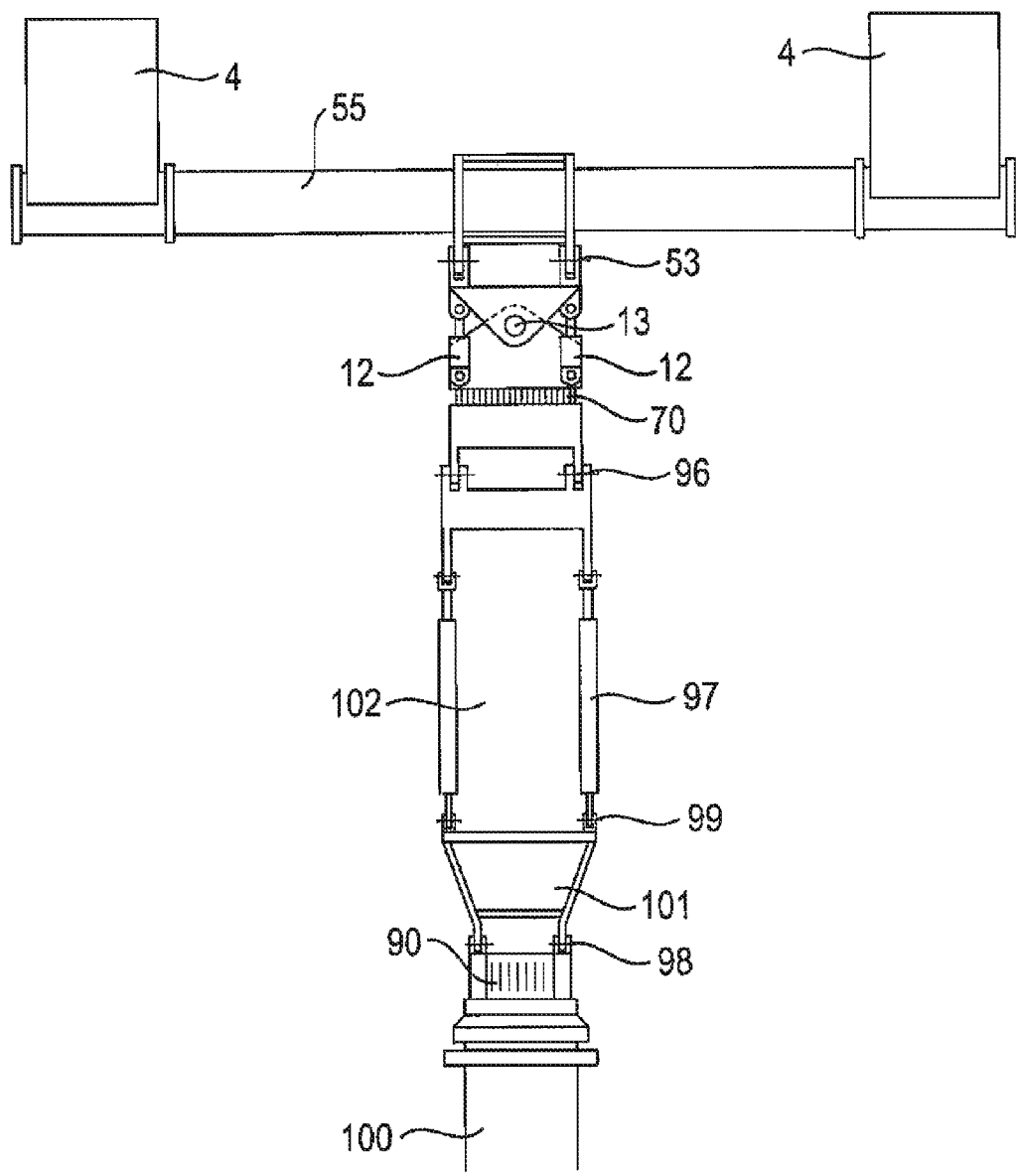

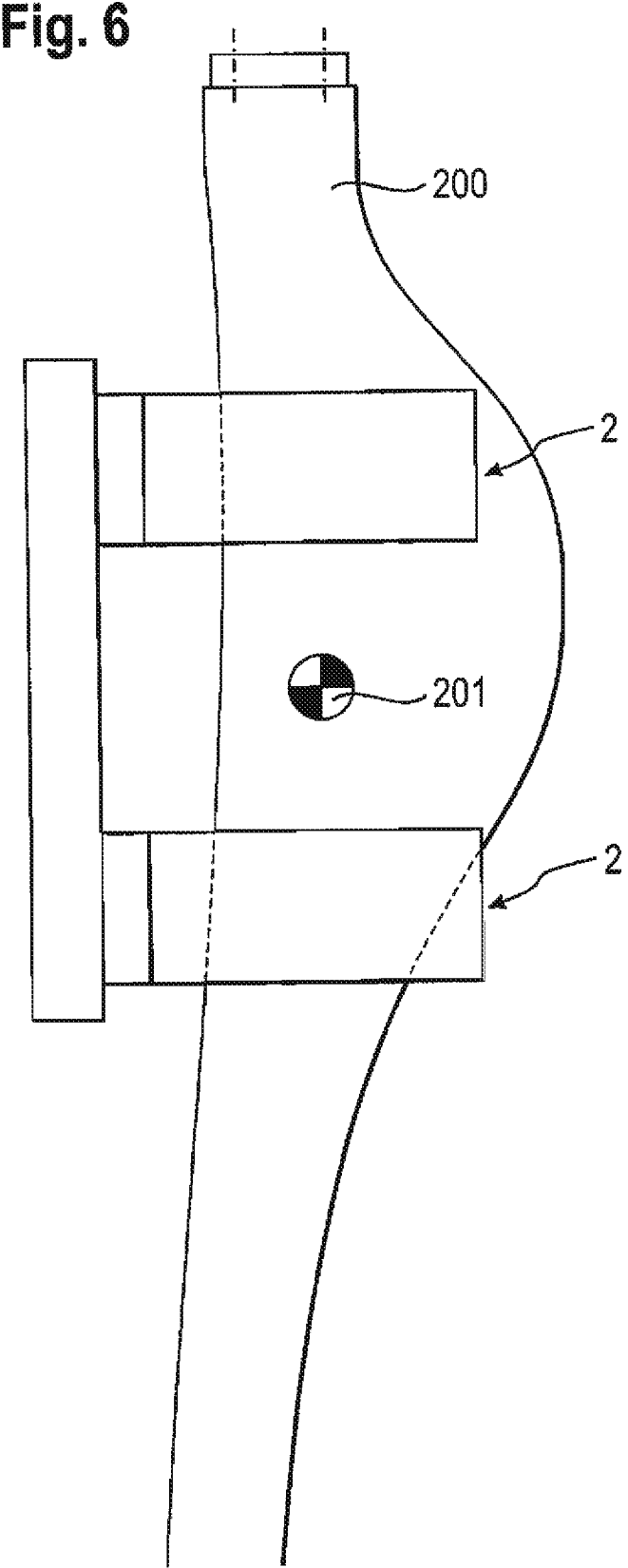

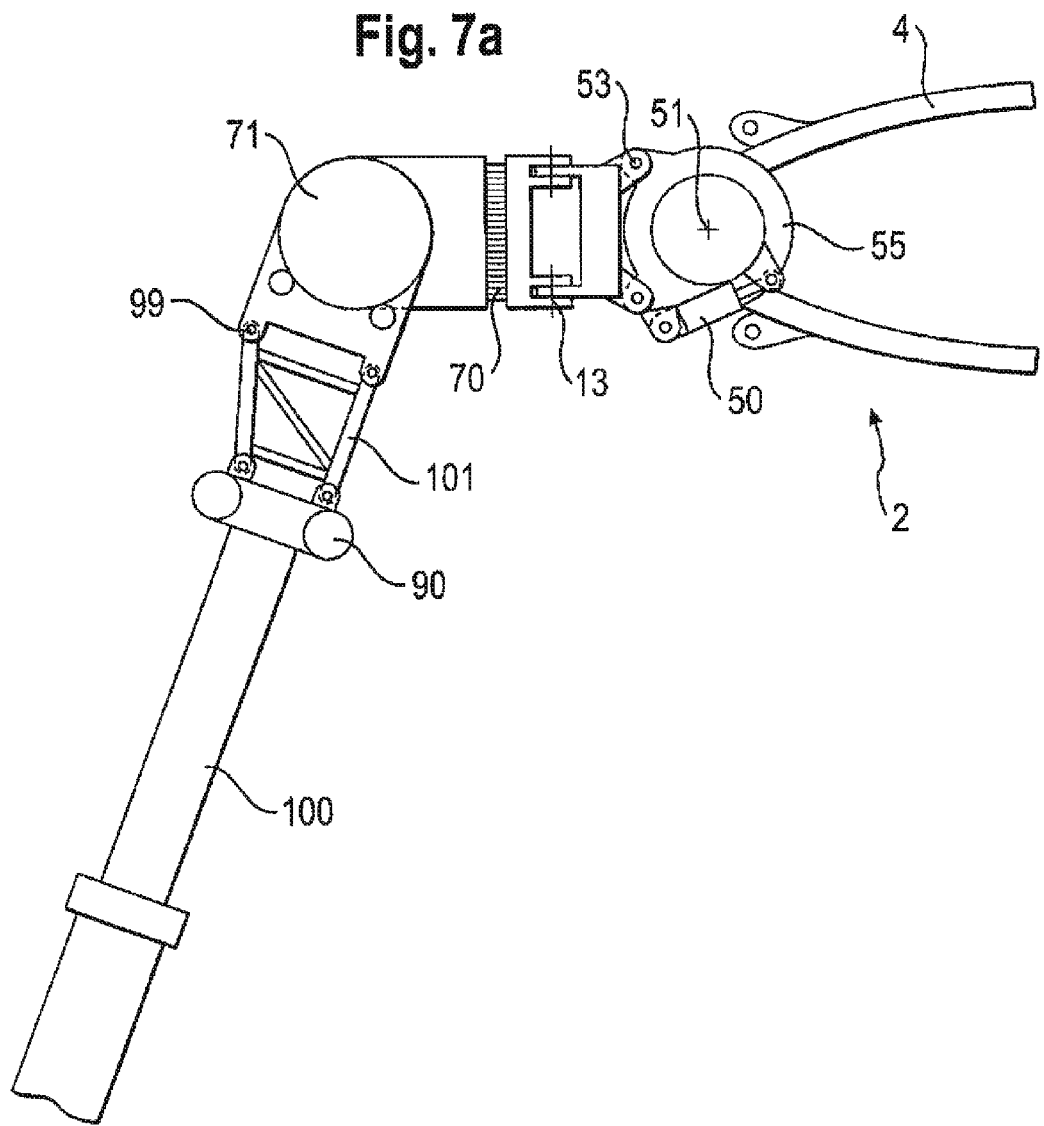

MANIPULATOR FOR THE ASSEMBLY OF ROTOR BLADES OF A WIND POWER INSTALLATION

The present invention relates to a manipulator for the assembly of rotor blades of a wind power installation. On the assembly of wind power installations, the rotor blades or vanes of the wind turbine have to be mounted to the hub at a great height. A dismantling and/or a reassembly of the rotor blades may also become necessary for repair and servicing purposes.

BACKGROUND OF THE INVENTION

In this connection, each rotor blade is fastened to the hub with a very large number of screws. It is therefore necessary for the assembly to align the rotor blade exactly to the bearing surface and to the hole pattern.

For this purpose, the rotor blade in accordance with the prior art is fastened to the hook block of a crane by means of a holding apparatus and is then raised into its assembly position. Due to the large exposed surface of the rotor blades, even small gusts of wind have a large effect on the position of the rotor blade. It is therefore always necessary in accordance with the prior art to wait for a time window in which no unacceptably high wind speeds can occur. This is all the more irritating since it is actually an objective to erect a wind power installation in regions which are particularly exposed to wind. This frequently causes a substantial time loss, which increases the assembly period and thus the costs for the expensive work equipment.

SUMMARY OF THE INVENTION

It is therefore the object of the present invention to provide a manipulator for the assembly of rotor blades of a wind power installation which reduces the assembly period and the costs of the assembly.

This object is satisfied by a manipulator in accordance with claim 1 the following description. The manipulator in accordance with the invention for the assembly of rotor blades of a wind power installation in this respect includes a receiving unit for the reception of a rotor blade and a connection unit via which the manipulator is or can be connected to the boom of a crane in a torque-rigid manner. The position and/or alignment of a rotor blade received in the receiving unit relative to the boom of the crane can be fixed by the manipulator in accordance with the invention. This torque-rigid connection between the boom of the crane and the rotor blade, which is made possible by the manipulator in accordance with the invention, cancels the disadvantages which resulted from the movable connection via the hoist rope in the prior art. It is thus possible with the manipulator in accordance with the invention also to position the rotor blade exactly at the hub of the wind power installation at greater wind speeds than in the prior art, whereby the assembly time and the costs of the assembly are reduced. In this respect, the rotor blade is received securely and free of clearance in the receiving unit and is connected secure against tilting directly to the crane boom via the manipulator so that only the torsional stiffness of the crane and of the manipulator as well as their load rating are limiting factors for the permitted wind speeds.

The manipulator in this respect advantageously has a positioning unit which is arranged between the receiving unit and the connection unit and via which a rotor blade received in the receiving unit can be aligned and/or positioned in a controlled manner relative to the boom. The manipulator hereby allows the rotor blade to be aligned and/or positioned in a controlled manner. The alignment of the rotor blade hereby does not only have to be effected by a movement of the crane or of the boom, while the disadvantages of a connection by the hoist rope are nevertheless avoided.

The receiving unit is in this respect advantageously fixable in different positions with respect to the connection unit, which can e.g. be effected by a corresponding control of positioning drives of the positioning unit or by separate fixing means.

The positioning unit advantageously allows an alignment and/or positioning of the receiving unit with at least two degrees of freedom and advantageously with at least three or four degrees of freedom. This makes possible an exact alignment and/or positioning of a rotor blade received in the receiving unit. If fewer than six degrees of freedom of movement of the manipulator are provided, the lacking degrees of freedom can be provided by a corresponding movement of the boom or of the crane.

The positioning unit of the manipulator in this respect advantageously has at least two pivoting units which each permit a pivoting about a pivot axis. This makes possible a controlled alignment and/or positioning of the rotor blade about the respective pivot axes. The pivot units can in this respect be designed e.g. as joints or as swiveling crowns. The positioning unit further advantageously has at least three or four pivot units which each allow a pivoting about a pivot axis.

The positioning unit further advantageously has one or more positioning drives. The positioning unit in particular has a positioning drive for each of its degrees of freedom. If pivot units are provided, the positioning unit advantageously has a pivot drive for each pivot unit. The alignment and/or positioning of the rotor blade received in the receiving unit can be carried out by control of these positioning drives. At the same time, the drives make possible a fixing of the receiving unit with respect to the connection unit and thus a torque-rigid connection between the rotor blade and the boom. Electric motors or hydraulic motors can e.g. be used as drives which drive the positioning unit, in particular the pivot units, via a transmission. Positioning drives in the form of pressure cylinders, in particular in the form of hydraulic or pneumatic cylinders, are equally possible. Hydraulic motors or electric motors are in this respect advantageously used to drive swiveling crown pivot connections; pressure cylinders, in contrast, are advantageously used to drive articulated connections.

The receiving unit further advantageously has at least one receiving drive to move a receiving tool of the receiving unit. A rotor blade can hereby be received by the receiving unit and released from it again.

The receiving unit in this respect advantageously has at least one receiving tool, and further advantageously two receiving tools which are arranged next to one another and via which the rotor blade can be gripped in the manner of pliers and can be held without play. The rotor blade can thus be gripped via the one receiving tool or via the at least two receiving tools and can be released again after the completed assembly. In this respect, at least two receiving tools are advantageously provided which are arranged next to one another and whose planes of movement are each aligned in parallel. The rotor blade can hereby be gripped at at least two points along its longitudinal axis. The rotor blade is in this respect advantageously gripped to the right and to the left of its center of gravity in order to keep the torques acting on the manipulator as small as possible.

The manipulator in accordance with the invention can in particular be connected to a main boom and/or to a luffing fly jib and/or to a boom tip and/or to a main boom extension of the main boom in a torque-rigid manner directly and/or via an adapter. The manipulator can thus be mounted on the boom or on the luffing fly jib, on the boom tip or on the main boom extension. The assembly can in this respect take place either directly on these components or via an adapter provided for this purpose. The manipulator can in particular be bolted to the respective components in this manner.

The connection to the boom of the crane advantageously takes place in this respect such that the crane can continue to raise loads via the hoist rope. The crane function of the crane is hereby in no way impaired by the manipulator.

The present invention furthermore comprises an adapter for the torque-rigid connection of a manipulator such as has been described above to a main boom and/or to a luffing fly jib and/or to a boom tip and/or to a main boom extension of the main boom of a crane. A manipulator in accordance with the invention can then be connected in a torque-rigid manner to the respective components via such an adapter.

The present invention furthermore includes the use of a manipulator in accordance with the invention on a crane, in particular on a telescopic crane or lattice boom crane, for the assembly on rotor blades of a wind power installation. Such a crane in this respect advantageously has a boom which can be luffed about a horizontal luffing axis and via which the hoist rope is guided, with the manipulator being connected to this boom in a torque-rigid manner.

The present invention furthermore comprises a crane, in particular a telescopic crane or a lattice boom crane, having a boom luffable about a horizontal luffing axis and having a manipulator for the assembly of rotor blades of a wind power installation such as has been presented above, with the connection unit of the manipulator being connected to the boom of the crane in a torque-rigid manner. The same advantages evidently result hereby such as were already discussed above with respect to the manipulator. The boom of the crane can be luffed up and is in this respect advantageously arranged at a superstructure of the crane which is pivotable about a vertical axis of rotation with respect to an undercarriage. A hoist winch is furthermore provided via which the hoist rope guided over the boom moves. The undercarriage advantageously has a travelling gear via which the crane can be moved. The crane in accordance with the invention is in particular advantageously a mobile crane which has a plurality of tired axles and which can hereby also be moved on normal roads. The crane in accordance with the invention can equally be a crawler crane.

The crane advantageously has a crane control which monitors and/or controls the movements of the manipulator. The monitoring and/or control of the manipulator is hereby made possible via the anyway present crane control of the crane which is adapted accordingly for this purpose.

The control of the manipulator advantageously takes place in this respect via operating elements in or at the crane. The control of the manipulator can e.g. take place from the crane cabin.

Provision can alternatively or additionally be made that the control of the manipulator takes place via a remote control. An alignment and/or positioning of the rotor blade can hereby e.g. be carried out by the fitter at the wind power installation itself.

The present invention furthermore comprises a method for the assembly of a rotor blade to a hub of a wind power installation, having the steps: providing a crane with a manipulator arranged at the boom in a torque-rigid manner; receiving a rotor blade in the manipulator; positioning and aligning the rotor blade with respect to the assembly position at the hub via the manipulator and/or the crane; mounting the rotor blade to the hub. The rotor blade is in this respect advantageously aligned and/or positioned via a positioning unit of the manipulator. The rotor blade is in this respect further advantageously received via at least two receiving tools of the receiving unit of the manipulator which are arranged next to one another and which engage along the longitudinal axis of the rotor blade on both sides of the center of gravity of the rotor blade. The torque loads acting on the manipulator are hereby reduced. The movement of the manipulator is in this respect further advantageously monitored and/or controlled via the crane control. The control of the manipulator can in this respect take place via operating element in or at the crane or via a remote control. The method in accordance with the invention in this respect advantageously takes place using a manipulator or a crane such as were represented above.

BRIEF DESCRIPTION OF THE DRAWINGS

The present invention will now be described in more detail with reference to embodiments and to drawings. There are shown:

FIG. 5a, b: two further alternative embodiments of the receiving apparatus of a manipulator in accordance with the invention;

FIG. 5c: a third embodiment of a manipulator in accordance with the invention, which is mounted on the boom of a crane, in a side view;

FIG. 5d: the third embodiment in a plan view;

FIG. 6: the weigh relationships on the receiving of a rotor blade by a manipulator in accordance with the invention;

FIG. 7a: a fourth embodiment of a manipulator in accordance with the invention, which is mounted on a boom of a crane, in a side view.

BRIEF DESCRIPTION OF THE PREFERRED EMBODIMENTS

Figure 1:
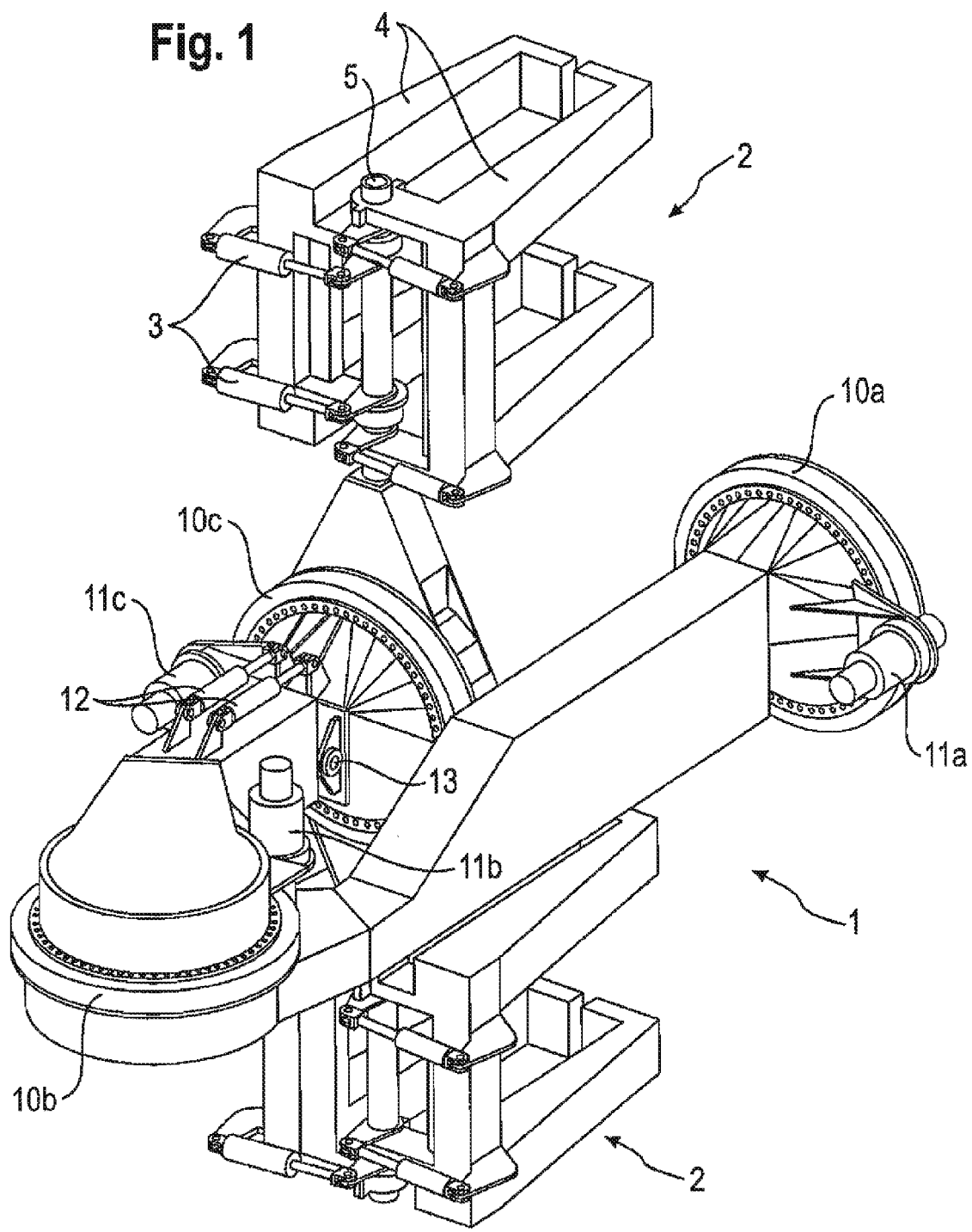
FIG. 1: a first embodiment of a manipulator in accordance with the invention in a perspective view.

A plurality of embodiments of a manipulator 1 in accordance with the invention are shown in the Figures which can securely receive a rotor blade 200 and which can additionally move it in all directions. The manipulator 1 is in this respect directly attached to a crane boom so that the movability resulting from the connection via a hoist rope is precluded. For this purpose, the manipulator has a receiving unit for the receiving of the rotor blade 200 and a connection unit via which it can be connected to the boom in a torque-rigid manner.

All embodiments in this respect show a receiving unit having two receiving tools 2 via which a rotor blade can be received securely and without play. For this purpose, respective drives 3 are provided with which plier-like gripping elements 4 of the receiving tools are applied to the rotor blade.

The receiving unit can hereby receive the rotor blade securely and without play and release it again after the assembly. The position and alignment of the rotor blade relative to the boom can be fixed by the manipulator by the torque-rigid connection of the manipulator to the boom. Wind forces engaging at the rotor blade hereby no longer have any influence on the position of the rotor blade so that the assembly is also possible at substantially higher wind speeds than in the prior art.

Furthermore, a positioning unit is provided between the receiving unit 2 and the connection unit and the rotor blade can be aligned and positioned to the boom in a controlled manner relative via said positioning unit. In this respect, the positioning unit has a plurality of pivot units which each allow a pivoting about a pivot axis, for which purpose corresponding pivot drives are provided.

Figure 2:
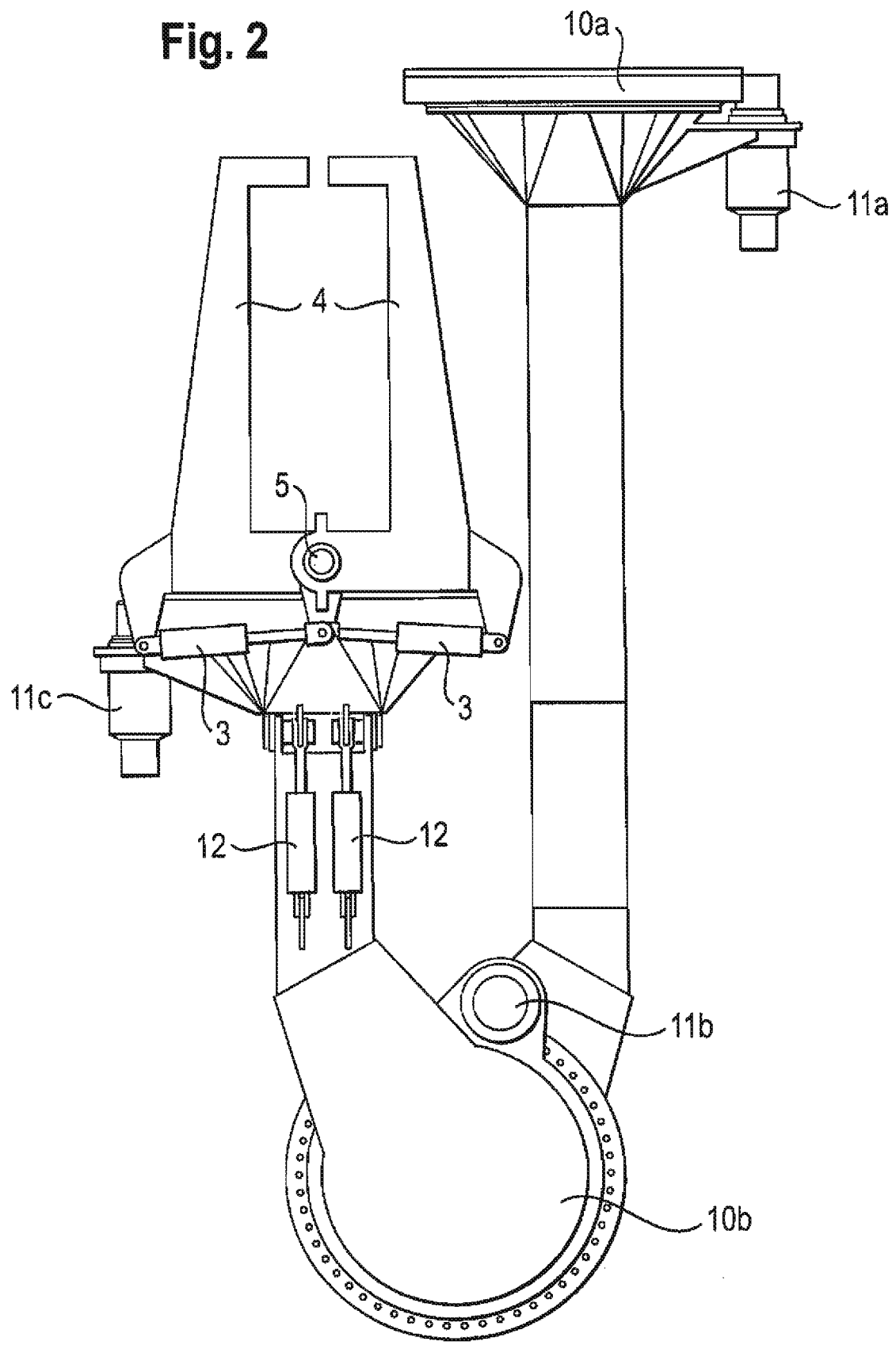
FIG. 2: the first embodiment of the manipulator in accordance with the invention in a plane view.

In the embodiment shown in FIGS. 1 and 2, the positioning unit in this respect has three pivot units 10a to 10c which are each designed as swiveling crowns and which are each driven via motors 11a-11c. The pivot unit 10a in this respect connects the connection unit, not shown, to a first arm whose longitudinal axis extends substantially along the axis of rotation of the pivot unit 10a. This first arm has the second pivot unit 10b at its one end and the axis of rotation of said first arm is aligned perpendicular to the axis of rotation of the first pivot unit 10a. The second pivot unit 10b connects the first arm to a second arm which is connected to a third arm, designed as short, via a joint 13. The joint axis of the joint 13 extends in this respect in a plane perpendicular to the axis of rotation of the second pivot unit 10b. Two hydraulic cylinders 12 are provided in this respect to pivot the third arm with respect to the second arm about the joint axis of the joint 13. The third arm with a very short design carries the third pivot unit 10c at which the receiving unit is arranged. The receiving unit in this respect has two plier-like receiving tools 2 which are arranged next to one another at a certain spacing so that they can grip a rotor blade at two points arranged remotely from one another along its longitudinal axis. The plier-like receiving tools 2 can be opened and closed in that the gripping elements 4 are pivoted about the pivot axis 5 via drives in the form of hydraulic cylinders 3. The pivot axis 5 is in this respect perpendicular to the axis of rotation of the third pivot unit 11c.

The manipulator thus allows a movement of the receiving unit with respect to the connection unit with four degrees of freedom about the pivot axes of the three pivot units 10a-10c in the form of swiveling crowns and of the fourth pivot unit in the form of the joint 13. An exact positioning and alignment of the rotor blade at the hub of the wind power installation is hereby possible.

Figure 4:
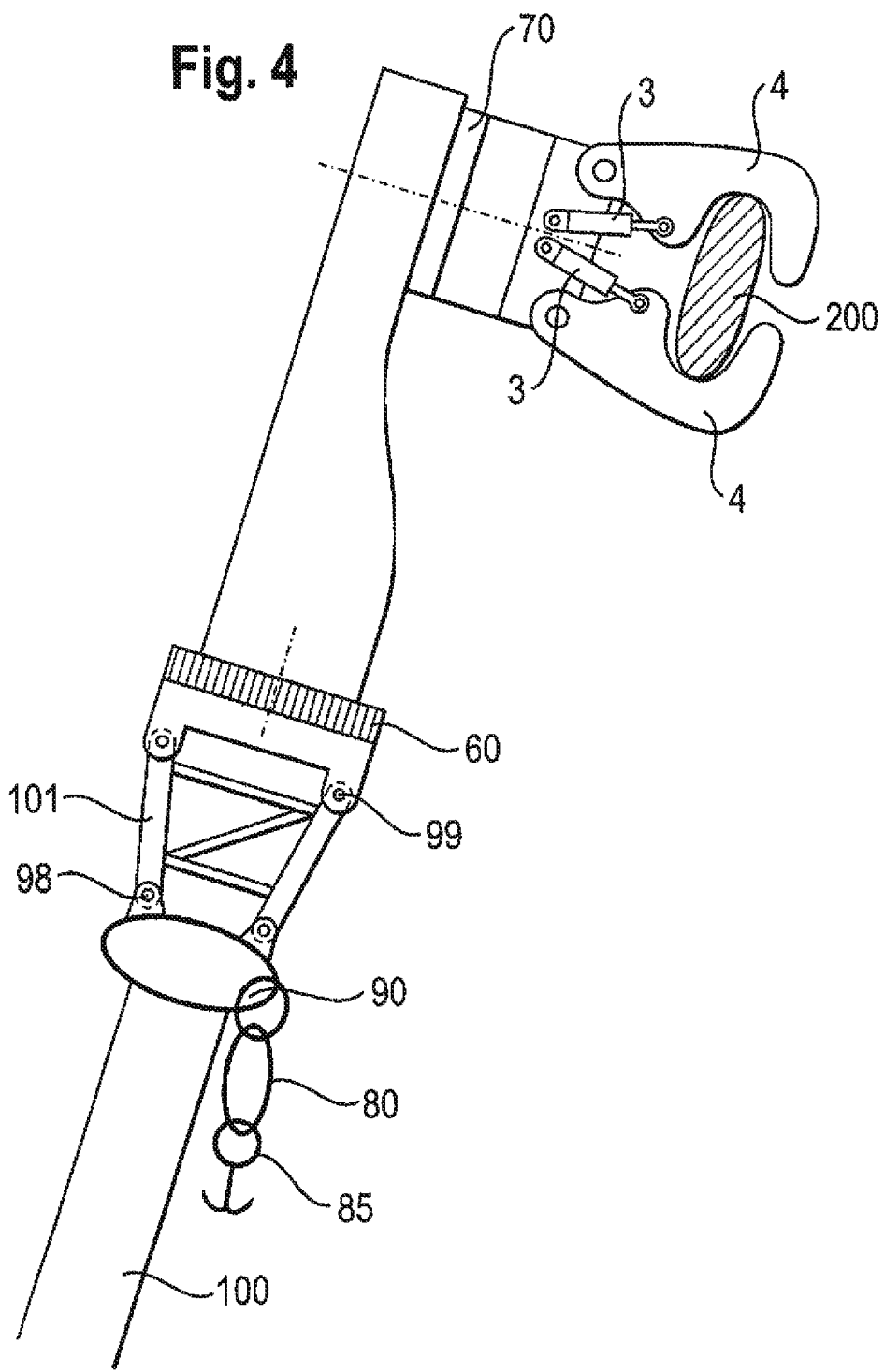
FIG. 4: a second embodiment of a manipulator in accordance with the invention, which is mounted on a crane, in a side view.

A second embodiment of a manipulator in accordance with the invention is shown in FIG. 4 which is arranged at a boom 100 of a telescopic crane. The manipulator is in this respect mounted on the roller head 90 of the boom so that the hoist rope can remain reeved in the roller head. A fully adequate crane operation is hereby also possible with a mounted manipulator. The hoist rope 80, which is reeved in the roller head 90, carries a crane hook 85 in this respect. The mounting of the manipulator in this respect takes place at the roller head via bolted connections 98 to which a lattice tip can be mounted in a conventional manner. An adapter 101 is provided for this purpose which is connected to the roller head 90 at the bolted connections 98. The manipulator is mounted at the adapter 101 via bolted connections 99. The manipulator in FIG. 4 in this respect has two swiveling crowns 60 and 70 whose axes of rotation are perpendicular to one another. The axis of rotation of the first swiveling crown is in this respect arranged substantially parallel to the longitudinal axis of the boom 100, while the axis of rotation of the second swiveling crown 70 extends in a plane which is perpendicular on the axis of rotation of the first swiveling crown 60. Only two degrees of freedom are thus given by the manipulator for the aligning and positioning of the vane 200, whereas the remaining alignment takes place via the crane.

A third embodiment of a manipulator in accordance with the invention is shown in FIGS. 5c and 5c. The receiving unit having the receiving tools 4 which are arranged at the longitudinal element 55 is in this respect pivotable about the axis of rotation 51 of the longitudinal element, for which purpose the hydraulic cylinder 50 is provided. This makes it possible to pivot the rotor blade, which is received along its longitudinal axis at two points by the receiving tools, about the axis of rotation 51 extending parallel to the longitudinal axis of the rotor blade. The positioning apparatus of the manipulator furthermore has a swiveling crown 70 as well as a tilt joint 13 which is driven via hydraulic cylinders. The receiving tool is mounted at bolted connection points 53 at the tilt joint 13, while the manipulator is bolted to the crane via bolted connection points 96.

In this connection, the manipulator shown in FIG. 5c and *d* is mounted at a luffing fly jib 102. The luffing fly jib is in this respect mounted to the telescopic boom 100, for which purpose an adapter 101 is used which is mounted to the roller head 90 via the bolted connection points 98. The luffing fly jib 102 can in this respect be pivoted in the luffing plane via the hydraulic cylinders 97 and thus makes possible a further degree of freedom for the positioning and alignment of the rotor blade.

Figure 7B:
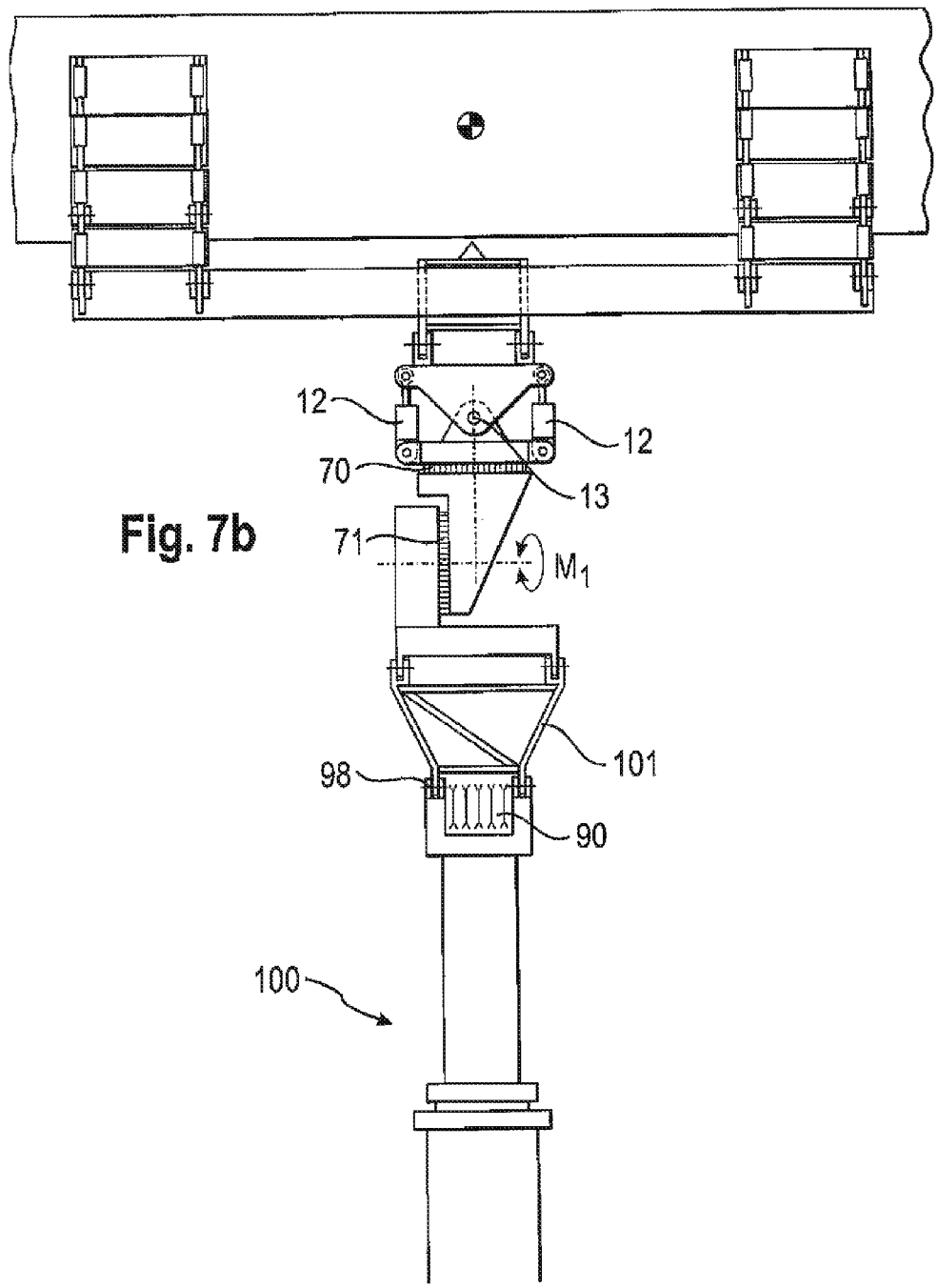
FIG. 7b: the fourth embodiment in a plan view.

A fourth embodiment of the manipulator in accordance with the invention is shown in FIGS. 7a and 7b which has two swiveling crowns 70 and 71 as well as one tilt joint 13. The two swiveling crowns 70 and 71 in turn have axes of rotation which are perpendicular to one another. In this respect, the axis of rotation of the first swiveling crown 71, arranged at the crane side, extends in a plane perpendicular to the longitudinal axis of the boom 100, while the axis of rotation of the second swiveling crown 70 extends in a plane which is perpendicular to the axis of rotation of the first swiveling crown. The swiveling crowns are in this respect movable via respective rotary drives. The tilt joint 13 is tiltable via hydraulic cylinders 12. The movability of the tilt joint 13 amounts in this respect to around 45° in each case in both directions of movement. The second swiveling crown allows a rotation about 360°; the second swiveling crown 71, in contrast, only allows a movement about around 120° in both directions of movement.

Figure 3:
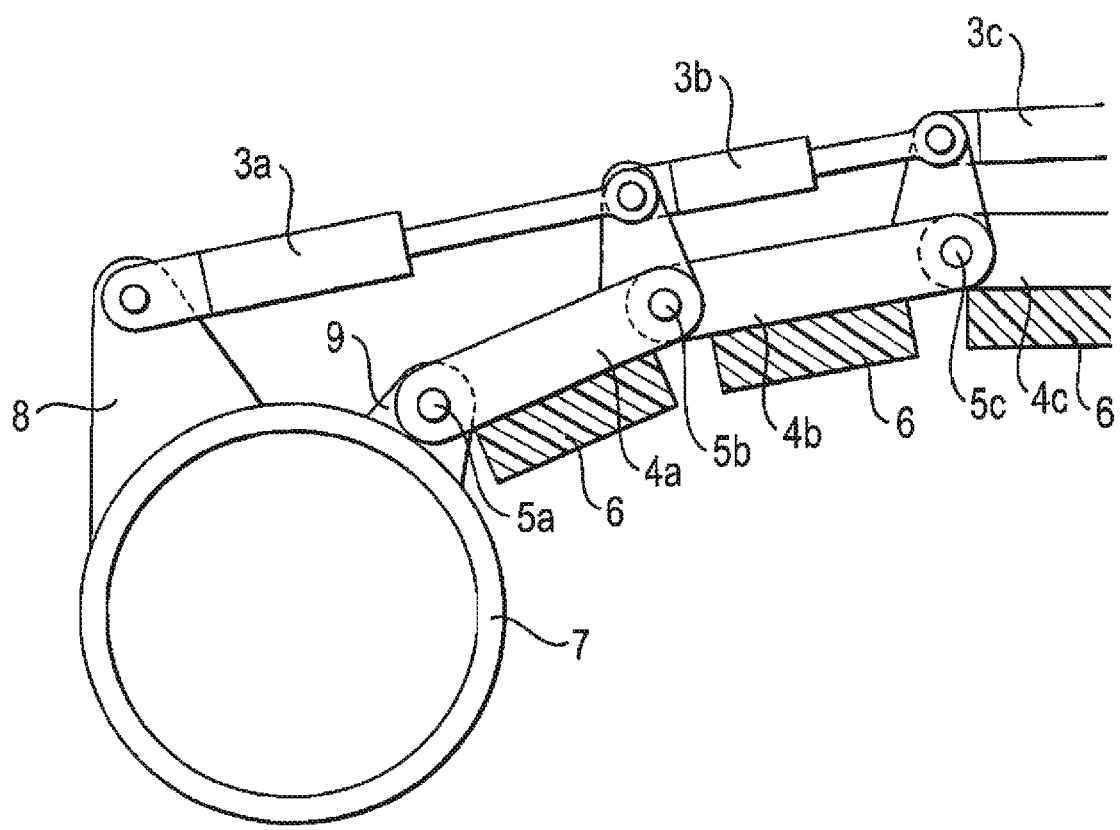
FIG. 3: an alternative embodiment of a receiving apparatus of a manipulator in accordance with the invention.

In the manipulators in accordance with the invention, the receiving of the rotor blade takes place via receiving tools with which the rotor blade can be gripped and can be released again. An alternative embodiment of the receiving tools 2 is shown in this respect in FIG. 3. FIG. 3 shows in this respect only one of the two plier-shaped gripping arms in a side view. In this respect, a plurality of members 4a, 4b and 4c are provided which are connected to one another in an articulated manner and which can be pivoted with respect to one another via hydraulic cylinders 3a-3c. The first member 4a is in this respect arranged via a joint 5a at a lug 9 of the axle 7. In this respect, a first cylinder 3a engages at the first member 4a and is pivotally connected to a further lug 8 at the axle 7 and thus pivots the first member about the joint axis 5a. The second member 4b is pivotally connected via the joint 5a to the first member 4a, with the pivoting between the first and the second members taking place via a second cylinder 3b which is pivotally connected to the two members. In the same manner, the third member 4c is pivotally connected to the second member via the joint 5c and can be moved via the third hydraulic cylinder 3c. A comparable engagement having a total of four members is shown in this respect in FIG. 5a. In this respect, in each case only one plier arm is shown; for a complete reception, a further gripping arm, advantageously of symmetric design, is naturally necessary. In the variant shown in FIG. 5a, the lugs 18 and 19 to which this second gripping arm is pivotally connected, are in this respect already shown at the axle 7. Such a solution is also shown in FIG. 7b.

To conserve the rotor blade, in this respect damping pieces 6 can be provided at the receiving tools, with each of the plier members carrying such a damping piece 6 in FIGS. 3 and 5a. It can in this respect be an elastically deformable material. Air cushions would equally be possible as damping pieces. Provision can optionally be made that it also simultaneously takes over the drive function.

A further alternative embodiment of a receiving tool is shown in FIG. 5b in which two gripping arms 4 are used which are pivotally connected to the lugs 9 and 11. The gripping arms 4 are in this connection extended to the rear beyond the pivot point 5, with hydraulic cylinders 3 which are pivotally connected to the axle 7 at the lugs 8 and 18 engaging at these extensions. The movement of the gripping arms 4 thus takes place in the manner of a lever via the hydraulic cylinders 3. The gripping arms 4 in turn have damping pieces 6 at their inner sides. Furthermore, a front pivot member 15 is pivotally connected in a swiveable manner to at least one gripping arm and can be pivoted via a hydraulic cylinder 16 and can hereby be applied to the rotor blade 200.

A further embodiment of the receiving tools is shown in FIG. 5c which in turn has two gripping arms 4 movable with respect to one another. A further embodiment of a receiving tool is shown in FIG. 4 in which the two individually pivotally connected gripping arms 4 are movable via inwardly arranged hydraulic cylinders 3. In this respect, the inner surfaces of the gripping arms are highly curved to be able to grip the rotor blade 22 in each case at its edges. In all other embodiments, the inner surfaces of the gripping arms are, in contrast, only slightly curved so that the rotor blade can be gripped at its rotor surfaces.

Provision is made with the method in accordance with the invention for the assembly of the rotor blade to the hub of a wind power installation first to bring the vanes roughly into an assembly position via the movement of the crane. This can take place via luffing and telescoping of the telescopic boom 100. The fine alignment then takes place by means of the manipulator. This can take place via the different swiveling crowns and the associated drives which correspondingly change the position of the receiving tools with respect to the boom of the crane. In addition to swiveling crowns or alternatively hereto, a tiling movement about a pivot axis can also take place at at least one point, e.g. driven by hydraulic cylinders. FIG. 5c in this respect shows a further possibility of changing the position of the vane. The cylinder 50 is provided for this purpose which can pivot the receiving unit with the vane about an axis 51 parallel to the longitudinal axis of the vane.

Alternatively to the embodiments shown with rotary drives, in this respect all drives can also be taken over by linear drives.

The manipulator can in this respect carry out a movement with one or more degrees of freedom. The embodiments in this respect show manipulators having two, three and four degrees of freedom, with the movement being in each case pivotal movements about corresponding pivot axes. A manipulator having four or more axles can in this respect take over the complete fine alignment of the vane. Provision can, however, equally be made that a part of the fine alignment is carried out by the manipulator and another part by the crane superstructure or by the boom. The latter can take place via rotating the superstructure, telescoping the boom, luffing the boom or luffing a luffing fly jib to which the manipulator has been attached. It must be noted in this respect that the vane is weight optimized so that a bolting connection of the telescopic sections among one another is not necessary. The telescopic cylinder can take up the load. A fine alignment by telescoping the boom is hereby possible.

It can in each case be recognized in FIGS. 5d and 7b that the two receiving tools 4 are arranged along a longitudinal element 55 at a certain spacing from one another so that the rotor blade is gripped at two different positions along its longitudinal axis. To avoid unnecessary torques on the manipulator, the rotor blade is received in this respect such that the center of gravity 201 of the rotor blade is disposed between the two receiving tools 4. This is shown again in FIG. 6.

The manipulator can, as shown in the embodiments, be attached to the main boom either directly or via a corresponding adapter piece. As likewise shown in the embodiments, the manipulator can also be attached to a luffing fly jib or, alternatively to this, to a boom tip or main boom extension.

The crane in accordance with the invention is advantageously a mobile crane having a telescopic boom to which the manipulator is mounted in a torque-rigid manner. The assembly in this respect takes place such that the crane functions are not impaired. In this method for the assembly of a rotor blade, all activities are in this respect monitored by the crane control. The monitoring and control of the manipulator in particular takes place via the crane control in this respect. The control of the manipulator can for this purpose take place via control elements in or at the crane, e.g. from the control cabin. A remote control of the manipulator is equally possible.

It is possible by the manipulator in accordance with the invention to assemble rotor blades, e.g. with the help of a telescopic crane, also at wind strengths which would no longer be suitable for an assembly with a rotor blade hanging at a load rope since the receiving of the rotor blades already takes place on the ground on the transport means by the propeller manipulator. No hook operation is therefore required for the reception since the telescopic cylinder is suitable to push out the telescopic boom and the propeller manipulator with the rotor blade together. The time of the assembly and thus also its costs can hereby be substantially reduced.

The invention claimed is:

1. A manipulator for the assembly of rotor blades of a wind power installation, having a receiving unit for the receiving of a rotor blade and having a connection unit via which the manipulator is connectable to the boom of a crane in a torque-rigid manner so that the position and/or alignment of a rotor blade received in the receiving unit relative to the boom can be fixed by the manipulator, and having a positioning unit which is arranged between the receiving unit and the connection unit and via which a rotor blade received in the receiving unit can be aligned and/or positioned in a controlled manner relative to the boom,
   wherein the receiving unit has at least one receiving drive for the movement of a receiving tool, and wherein the positioning unit allows an alignment and/or positioning of the receiving unit with at least two degrees of freedom.

2. A manipulator in accordance with claim 1, wherein the positioning unit has at least two pivot units which each allow a pivoting about a pivot axis.

3. A manipulator in accordance with claim 2, wherein the positioning unit has at least one positioning drive.

4. A manipulator in accordance with claim 3, wherein the receiving unit has at least one receiving drive for the movement of a receiving tool.

5. A manipulator in accordance with claim 2, wherein the receiving unit has at least one receiving drive for the movement of a receiving tool.

6. A manipulator in accordance with claim 1, wherein the positioning unit has at least one positioning drive.

7. A manipulator in accordance with claim 1, wherein the receiving unit has at least one receiving tool via which the rotor blade can be gripped in the manner of pliers and can be held free of play.

8. A manipulator in accordance with claim 1, which can be connected to a main boom and/or a luffing fly jib and/or a main boom extension of the main boom directly or via an adapter in a torque-rigid manner.

9. A manipulator in accordance with claim 1, wherein upon the connection of the manipulator to the boom of the crane the crane can continue to lift loads via a hoist rope.

10. An adapter for the torque-rigid connection of a manipulator in accordance with claim 1 to a main boom and/or to a luffing fly jib and/or to a boom tip and/or to a main boom extension of the main boom of a crane.

11. A telescopic or lattice boom crane, having a boom luffable about a horizontal luffing axis and having a manipulator for the assembling of rotor blades of a wind power installation in accordance with claim 1, wherein the connection unit of the manipulator is connected to the boom of the crane in a torque-rigid manner.

12. A crane in accordance with claim 11, having a crane control which monitors and/or controls the movements of the manipulator.

13. A crane in accordance with claim 12, wherein the control of the manipulator takes place via operating elements in or at the crane.

14. A crane in accordance with claim 12, wherein the control of the manipulator takes place via a remote control.

15. A manipulator in accordance with claim 1, wherein the positioning unit has at least one positioning drive.

16. A manipulator in accordance with claim 15, wherein the receiving unit has at least one receiving drive for the movement of a receiving tool.

* * * * *